Jan. 16, 1923.
M. E. CHAMBERLAIN.
VEHICLE WHEEL.
FILED JUNE 19, 1922.
1,442,047.
2 SHEETS—SHEET 2.
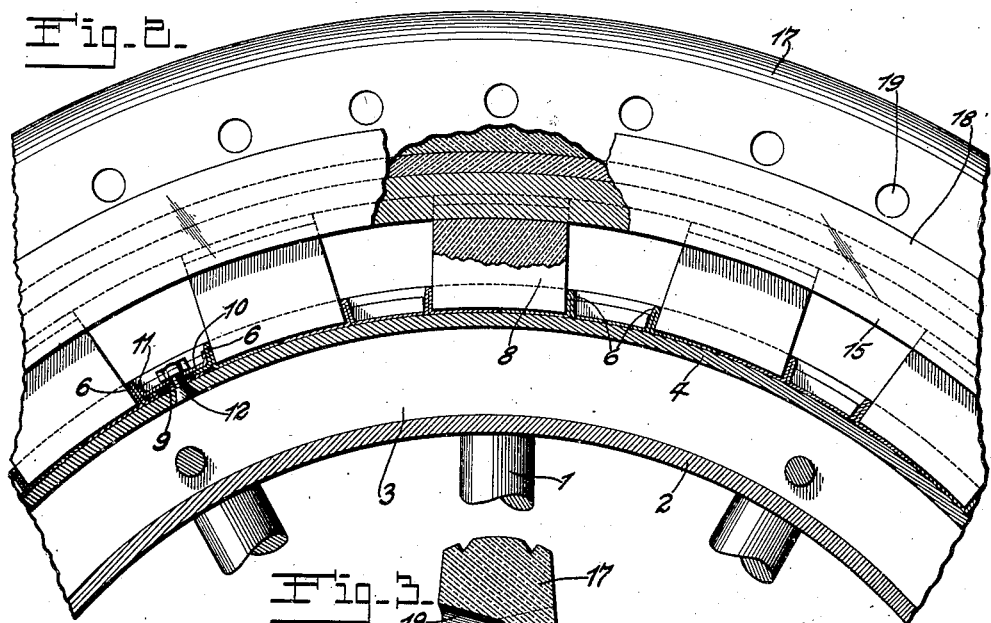
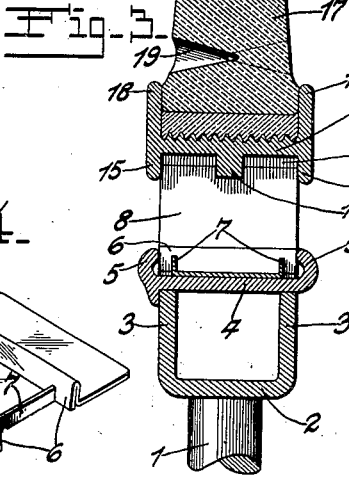
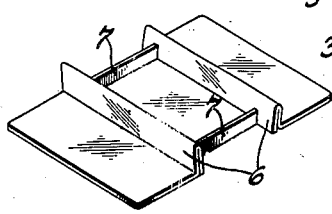
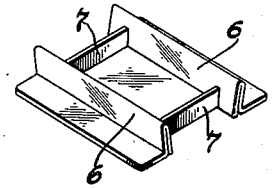
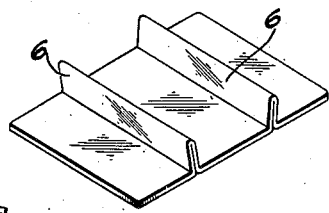
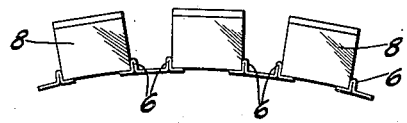
Inventor.
Minor E. Chamberlain,
by Rippey & Kingsland,
His Attorneys.

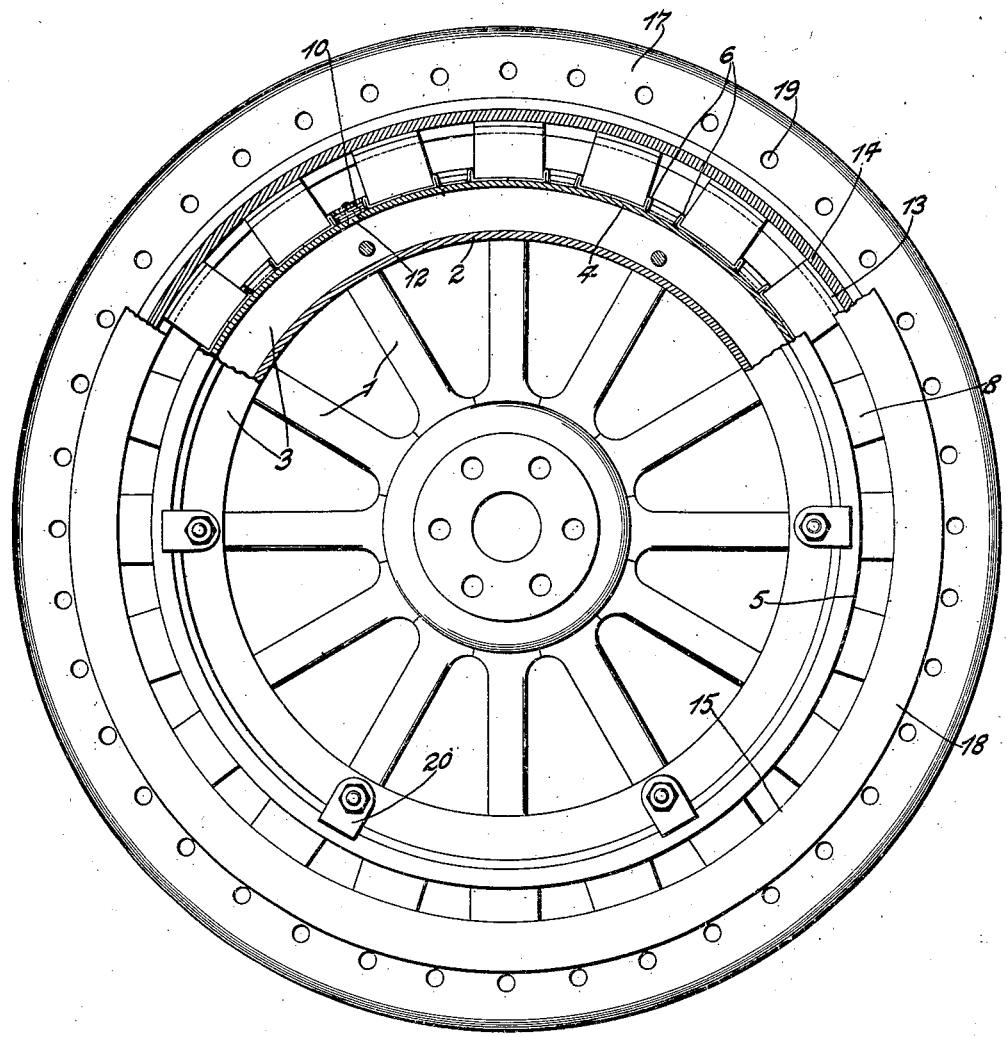

Patented Jan. 16, 1923.

1,442,047

UNITED STATES PATENT OFFICE.

MINOR E. CHAMBERLAIN, OF ST. LOUIS, MISSOURI.

VEHICLE WHEEL.

Application filed June 19, 1922. Serial No. 569,305.

*To all whom it may concern:*

Be it known that I, MINOR E. CHAMBERLAIN, a citizen of the United States, residing at St. Louis, Missouri, have invented a new and useful Vehicle Wheel, of which the following is a specification.

This invention relates to vehicle wheels.

An object of the invention is to provide an improved vehicle wheel embodying an efficient construction and arrangement of parts by which the desired resiliency and elasticity are obtained without the use of pneumatic tires or springs.

Another object of the invention is to provide an improved vehicle wheel comprising concentric outer and inner rims held in proper spaced relationship by solid resilient blocks of rubber or the like, and means for preventing displacement of said blocks.

Another object of the invention is to provide a vehicle wheel embodying the novel and improved features herein shown and described.

In the drawings—

Fig. 1 is a side elevation with parts in section of my improved wheel.

Fig. 2 is an enlarged sectional view of the rim portion of the wheel showing the manner in which the resilient blocks are mounted upon the spacers.

Fig. 3 is a cross sectional view of the rim portion of the wheel.

Fig. 4 is a perspective view of a preferred form of spacer.

Fig. 5 is a perspective view of another form of spacer, of shorter length than that shown in Fig. 4.

Fig. 6 is a perspective view of still another form of spacer.

Fig. 7 is a view showing the short form of spacers in their relationship to the resilient supporting blocks for the tire and outer rim of the wheel.

As shown, the metallic felly is rigidly secured to the outer ends of the blocks 1 of the wheel. The felly comprises a ring 2 rigidly secured to the outer ends of the blocks, and two side flanges 3 rigid or integral with the side edges of the ring 2. A demountable rim 4 is secured on the felly 2—3 having side flanges 5 for holding the resilient blocks and the spacers therefor in position. The flanges 5 form an annular space around the demountable rim 4 in which the spacers and the inner edges of the resilient blocks are located.

As shown, each spacer consists of a piece of curved sheet metal folded to provide transverse radial flanges 6 of double the thickness of the metal. In the form of spacer shown in Figs. 1 to 5 inclusive the central portion of the sheet metal spacer between the flanges 6 is split transversely a short distance adjacent to each of the flanges 6 providing tongues 7 which are bent outwardly. The ends of the tongues 7 abut against the flanges 6 providing proper strength and rigidity. The spacers shown in Figs. 1 to 4 inclusive are of sufficient length to abut end to end when placed around the rim 4 between the side flanges 5 thereof.

The blocks 8 are of solid rubber possessing the desired resiliency to render the use of a pneumatic tire unnecessary. The inner ends of the blocks 8 are located between the flanges 5 of the demountable rim 4 upon the ends of the spacers so that the flanges 6 fit close against the sides of the blocks and hold them in proper spaced relationship on the rim.

Two of the adjacent spacers are made demountable for convenience in assembling the parts and also for convenience in removing any of the parts. As shown (Fig. 2) the end of one of the spacers has an elongated slot 9 and is overlapped by the end of the adjacent spacer having a similar slot registering with the slot 9. A metallic plate 10 having its ends up-turned as indicated at 11 to bear against the flanges 6 of the adjacent spacers is placed between the adjacent spacers and is secured in place by a fastener comprising a screw 12. The screw 12 passes through the rim 4, with the head of the screw inside the rim and the releasable nut on the outer end of the screw clamping and securing the plate 10 in position. It will be seen that the two spacers whose ends overlap are each provided with a single flange 6 so that there is nothing to prevent removal of such spacers when the securing device is released.

The spacer shown in Fig. 5 is similar to the spacers above described with the exception that the plate of the spacer shown in Fig. 5 is relatively short, providing relatively short ends which extend only a short distance under the resilient blocks.

The spacer shown in Fig. 6 is similar to the spacer shown in Fig. 4 with the exception that the up-turned flanges 7 are omitted.

The spacer shown in Fig. 7 is similar to the spacer shown in Fig. 5 with the exception that the flanges 7 are omitted. Fig. 7 shows the relatively short ends of the spacers under the resilient blocks.

Each of the resilient blocks 8 is provided with a hard friction surface 13 on its outer end. The outer rim 14 has side flanges 15 between which the outer ends of the resilient blocks 8 are seated. The rim 14 is provided with an internal flange 16 seating in grooves in the blocks 8 provided for that purpose. A solid rubber tire 17 is mounted on the rim 14 between the outwardly extending side flanges 18 thereof, and is provided with a number of cavities 19 extending inwardly from the outer side and similar cavities extending outwardly from the inner side. The outer and inner series of cavities are arranged in relative staggered relationship so that they do not open into each other.

As before stated the rim 4 is demountable. As shown, the rim 4 is held on the felly 2—3 by releasable clips 20.

From the foregoing it will be seen that my invention accomplishes all of its intended objects and purposes, and that the wheel is strong and durable and provides the desired elasticity and resiliency without the use of metallic springs or pneumatic tires. The invention may be varied otherwise than as described without departure from the principle of the invention.

I do not restrict myself unessentially, but what I claim and desire to secure by Letters Patent is:—

1. A wheel, comprising a felly, a rim mounted on said felly, a number of removable spacer plates around said rim, radial flanges on said plates, resilient blocks seated on said plates between said flanges, side flanges integral with said rim holding said plates and said blocks from lateral movement in either direction, means for holding said blocks from circumferential movement relative to said rim, an outer metallic rim encircling the blocks, and a tire mounted on the outer rim.

2. A wheel, comprising a felly, a demountable rim mounted on the felly, a series of removable spacer plates encircling said rim, a releasable device preventing circumferential movement of said plates relative to said rim, radial flanges on said spacer plates, resilient blocks seated on the spacer plates between said flanges, a tire, and means for holding the tire upon the resilient blocks.

3. A wheel, comprising a demountable rim, flanges on the edges of said rim, spacer plates encircling the rim between said flanges, a releasable device preventing circumferential movement of said plates relative to said rim, resilient blocks seated on said spacer plates between said flanges on said rim, parts in connection with said spacer plates holding said blocks from relative movement, a tire, and means mounted on said blocks for holding said tire in position.

4. A wheel, comprising a demountable rim, a series of spacers encircling the rim, a releasable device preventing circumferential movement of said plates relative to said rim, radial flanges on the outer sides of said spacers, resilient blocks seated on said spacers between said flanges, a tire, and means for holding the tire around said blocks.

5. A wheel, comprising a rim, spacer plates mounted on the rim, radial flanges on the spacer plates, resilient blocks mounted on the spacer plates between said flanges, a releasable device in connection with the rim holding certain of said spacer plates in position, and tire structure mounted on said blocks.

6. A wheel, comprising a demountable rim, spacer plates mounted on the rim, resilient blocks mounted on the spacer plates, a releasable device in connection with the rim preventing circumferential movement of said plates relative to the rim, parts in connection with the spacer plates holding said blocks in proper relationship, an outer rim, side flanges on the outer rim embracing the side edges of said resilient blocks, and a tire mounted on the outer rim.

MINOR E. CHAMBERLAIN.